No. 754,660. PATENTED MAR. 15, 1904.
L. LYNDON.
RHEOSTAT.
APPLICATION FILED AUG. 8, 1902.
NO MODEL.
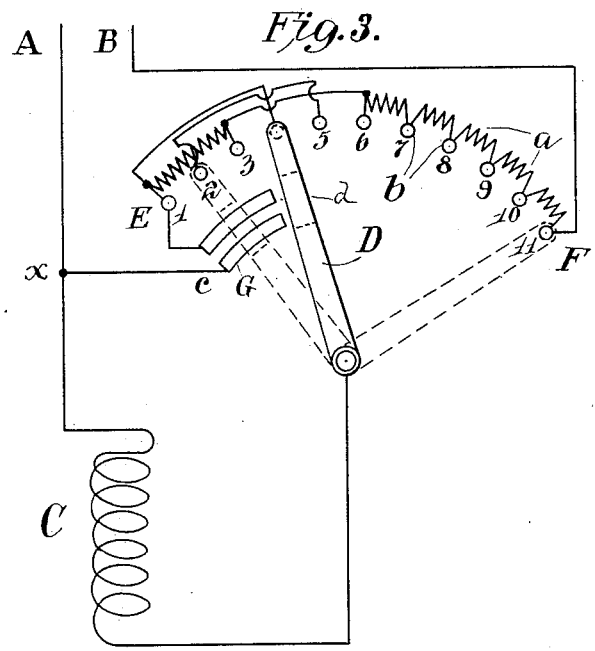
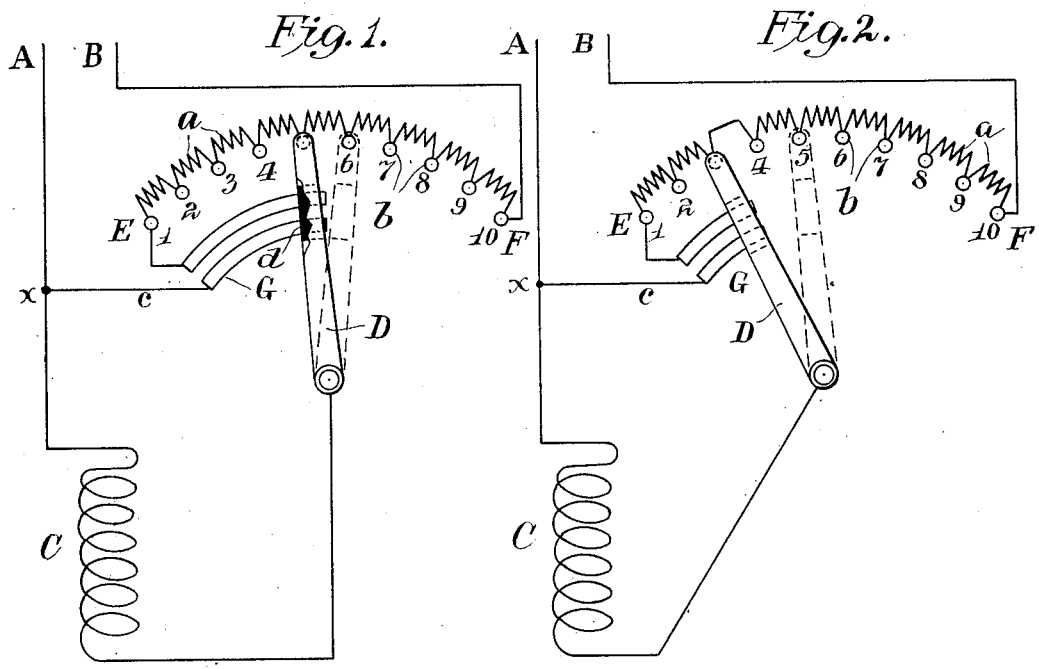
Witnesses
Edgeworth Burns
Alfred W. Kiddle
Inventor
Lamar Lyndon
By his Attorneys
Redding, Kiddle & Greeley No. 754,660. Patented March 15, 1904.

UNITED STATES PATENT OFFICE.

LAMAR LYNDON, OF NEW YORK, N. Y., ASSIGNOR TO NATIONAL BATTERY COMPANY, OF BUFFALO, NEW YORK, A CORPORATION OF NEW JERSEY.

RHEOSTAT.

SPECIFICATION forming part of Letters Patent No. 754,660, dated March 15, 1904.

Application filed August 8, 1902. Serial No. 118,864. (No model.)

*To all whom it may concern:*

Be it known that I, LAMAR LYNDON, a citizen of the United States, residing in the borough of Manhattan, city of New York, State of New York, have invented certain new and useful Improvements in Rheostats, of which the following is a specification, reference being had to the accompanying drawings, forming a part hereof.

This invention relates to devices for varying the potential of a current of electricity, and more especially to devices of this nature wherein the current is adapted to be passed through one or more of several resistances in order to effect the variations.

While the invention is not limited in its application to any specific use or purpose, it is particularly applicable for producing such changes of potential as are desirable in currents flowing through field-windings, translating devices, and coils in general, and these coils and all other such devices for receiving a current of electricity will be referred to hereinafter as "receiving" devices.

The present invention is particularly concerned with the mode of connecting up the aforesaid resistances, both with respect to the line and the receiving device and also with respect to each other.

Among the different forms of rheostats in use heretofore and designed to effect variations in potential for the purposes above indicated there may be found, in general, two methods of connecting up resistances with respect to the line and receiving device. One of these methods is to place the receiving device and the resistances in series on the line, any or all of the resistances being adapted to be cut out from the line, and the other method is to bridge the resistances across the line and to connect up the receiving device, so that it may be placed at will in series with a part or none of the resistances and parallel with the remaining part or all of the resistances, respectively. The objection to the first method of connecting up the resistances with respect to the line and receiving device is that with this arrangement it is never possible to obtain a potential of zero across the terminals of the receiving device, while the second arrangement is uneconomical, inasmuch as the total current can never flow through the receiving device, the energy of a part of the current being thereby wasted.

The object of the present invention, accordingly, is to provide a rheostat which by being properly connected with the receiving device and the line will permit the total current to flow through said receiving device whenever it is desired and with which it will be possible to vary at will the potential of the current in said receiving device from zero to the maximum.

In the drawings, where the device is shown diagrammatically, Figure 1 represents the improved form of rheostat described herein. Figs. 2 and 3 represent modifications in the improved rheostat more particularly described hereinafter.

Referring now to the improved forms of rheostats shown diagrammatically in Figs. 1 to 3, inclusive, A and B indicate the supply-mains; C, a receiving device; D, the controller-arm of the rheostat, and $a$ and $b$ the resistances and contacts, respectively, of the rheostat. In Fig. 1 the terminals of the resistances are connected with the adjacent contact-buttons, respectively, and the extreme contact F is connected with the line. The other extreme contact E is connected with one terminal of a switch, (indicated at G,) the other terminal of said switch being connected with the line by the conductor $c$. Carried by controller-arm D and insulated therefrom is a contact-plate $d$, the switch G and arm D being so placed with reference to each other upon the rheostat-box that in one portion of the travel of arm D contact $d$ will connect the two terminals of the switch G, while at a predetermined point in the travel of said arm the contact $d$ will be moved off the terminals of the switch and the circuit through said switch will be broken. So far as this invention is concerned the precise point at which said circuit is broken is immaterial, it being shown in the drawings, Fig. 1, to be just after arm D passes the fifth contact-button in its movement toward the right.

It is evident from Fig. 1 that when the arrangement just described is put in operation the current which flows in conductor A will divide at $x$, part flowing in conductor $c$ through the resistances to conductor B and part through receiving device C and arm D, thence through certain of the resistances, (depending upon the position of arm D,) and finally to conductor B, the relative portions of the current flowing over each path depending upon the electrical resistance of each path. If, however, the position of arm D be moved from the position shown in Fig. 1 to the position indicated by dotted lines in the same figure, the current will cease to flow over the first of the above-mentioned paths and the total current will flow through the receiving device C. It will be seen that the current through the receiving device C may be entirely cut out, and accordingly the difference of potential between the terminals of the receiving device will be zero, and that by moving the arm to the right the potential between said terminals may be increased through varying values to a maximum, which will occur when the arm is in contact with the other extreme contact-button F. As the controller-arm D of the rheostat is moved to the right from button to button the variations of potential in the receiving device C, providing the resistances are all equal each to each, will be equicrescent except at the point where the switch is opened. At this point as the controller-arm is moved to the right the voltage at the terminals of the receiving device will be increased by an amount much larger than that due to cutting out the single resistance between buttons 5 and 6, Fig. 1, owing to the cutting out of the circuit bridged across the line. In order to prevent this relatively large variation, one of the resistances may be omitted, as is shown in Fig. 2, the resistance-coil between buttons 3 and 4 being left out, there being, however, a conductor connecting these two buttons. In passing from button 3 to button 4 of the rheostat the arm D is adapted to cut out all the resistances in parallel, but none of the resistances in series with the receiving device.

For some purposes it may be desirable to prevent an excessive rise of voltage at the terminals of the receiving device which would be due to the opening of switch G with a current of high voltage. Accordingly the arrangement for connecting up the resistances with respect to each other, as illustrated in Fig. 3, is proposed. In Fig. 5 there are no resistances or conductors connecting buttons 3 and 4, 4 and 5, or 5 and 6; but three conductors are provided to connect, respectively, buttons 1 and 4, 2 and 5, and 3 and 6. With this arrangement it will be obvious that the current will travel as follows: When arm D is in contact with the extreme button E, resistances Nos. 1 to 11 are in series across the line, and as button E is connected with the line at $x$ the potential in the receiving device will be equal to zero. When the controller-arm is on the button No. 2, the voltage through the receiving device will be due to the drop in the resistance-coil between buttons 1 and 2. When the controller-arm is on button No. 3, the voltage through the receiving device is increased by the amount of the drop between buttons 1 and 3. When the controller passes to button No 4, the circuit across the line is cut out on account of the opening of the switch, and to prevent an extreme rise of voltage in the receiving device the resistances between buttons 1 and 3 are again thrown in, and (buttons 1 and 4 being connected by a suitable conductor) the path of the current is from arm D to button 4, to button 1, to button 11. When the controller passes to button No. 5, the resistance between buttons 1 and 2 is again cut out, and when the controller passes to button No. 6 the resistance between buttons 2 and 3 is cut out. Finally, as the controller D passes from button 6 to 11 the path of the current is simply that of an ordinary rheostat, the only resistances in circuit being between the end of the controller-arm and extreme contact-button F, which resistances are in series with the receiving device.

It will be evident that instead of employing an arm, as D, to operate the switch and control the circuit through the rheostat any other suitable means may be employed which will effect both of these operations, and thereby produce the variations of current potential in the manner heretofore described, and this invention is accordingly not restricted to the use of a controller-arm as the only means of performing these functions.

I claim as my invention—

1. In combination for the purposes hereinbefore set forth, a plurality of resistances electrically connected and bridged in circuit across the line, a receiving device with which said resistances are adapted to be connected either in parallel or partly in series and partly in parallel, means for so connecting said resistances and receiving device, and a switch operated by said means to open the circuit across the line at a predetermined point, substantially as described.

2. In combination for the purposes hereinbefore set forth a plurality of resistances electrically connected and bridged in circuit across the line, a receiving device with which said resistances are adapted to be connected either in parallel or partly in series and partly in parallel, a controller-arm in circuit with said receiving device for so connecting said resistances and receiving device, and a switch operated by said arm to open the circuit across the line at a predetermined point, substantially as described.

3. In a rheostat, the combination of a plurality of resistances adapted to be bridged in circuit across the line, a plurality of contacts to which said resistances are connected, a switch controlling said circuit across the line, and a controller-arm in circuit on the line and adapted to make electrical connection with any of said contacts, said arm being also adapted to operate said switch and thereby to open the circuit across said line at a predetermined point, substantially as described.

4. In a rheostat, the combination of a plurality of resistances adapted to be bridged in series across the line, a plurality of contacts to which said resistances are connected, a controller-arm in circuit upon the line and adapted to make electrical connection with any of said contacts whereby to include certain of said resistances in series upon the line, and a switch controlling said circuit across the line and operated by said arm to open said circuit across the line at a predetermined point, substantially as described.

5. The combination with a rheostat having a plurality of resistances adapted to be placed in circuit across the supply-mains, a plurality of contacts to which said resistances are connected, a switch controlling said circuit across the supply-mains, and a controller-arm adapted to make electrical connection with any of said contacts and also adapted to operate said switch, of a receiving device in circuit on the line between said arm and one terminal of said circuit across the supply-mains, said arm at one extreme contact placing all the resistances in series across the supply-mains and at a predetermined point as it moves toward the other extreme contact opening the circuit across the supply-mains, the only resistances receiving current after said arm passes said predetermined point being the resistances included between the end of the arm and said other extreme contact, substantially as described.

6. In a rheostat, the combination of a plurality of resistances in electrical connection, contacts at both ends of said plurality of resistances whereby current may be supplied to the same, a switch in series with said resistances comprising a pair of terminals and a contact-piece, one of said terminals being connected with one main of the supply-circuit and the other of said terminals being connected with one of said contacts, the second of said contacts being connected to the other supply-main, a controller-arm adapted to be placed in circuit on the line and carrying said contact-piece, said arm being also adapted to make electrical contact with any of the resistances and thereby to be placed in series with a part of said resistances and in parallel with the rest of said resistances until said arm is moved to open said switch when the current will only flow through certain of the resistances all of which will be serially connected with said arm and in circuit on the line, substantially as described.

7. In a rheostat, the combination of a plurality of contacts arranged *seriatim*, a plurality of resistances severally placed between certain but not all of the pairs of adjacent contacts and having their terminals electrically connected with said adjacent contacts respectively, said contacts and resistances being adapted to be bridged in circuit across the line, a switch controlling said circuit across the line, a controller-arm in circuit on the line and adapted to make electrical connections with any of the contacts, said arm being also adapted to operate said switch and thereby to open the circuit across the line at a predetermined point, and a plurality of conductors electrically connecting certain pairs of said contacts which are not adjacent, substantially as and for the purpose set forth.

8. In a rheostat, the combination of a plurality of contacts arranged *seriatim*, a resistance inserted between each of the adjacent contacts except between the contacts 3 and 4, 4 and 5 and 5 and 6, respectively, the terminals of said resistances being electrically connected with their adjacent contacts respectively, and three conductors connected respectively with contacts 1 and 4, 2 and 5, and 3 and 6, substantially as and for the purpose set forth.

9. The combination of a supply-circuit, a regulated circuit, a resistance having a plurality of contact-points, a regulator-arm adapted to coöperate with said contact-points to determine the amount of resistance in series with the regulated circuit, and means operated by said regulator-arm to place some of the resistance in parallel with the regulated circuit, whereby by adjusting the position of said arm little or no current may be made to flow through the regulated circuit, the voltage of which will be that which results from the fall of potential along the parallel resistance, and whereby a greater amount of current may be made to flow through the regulated circuit by cutting out the parallel resistance and as much of the series resistance as is desired.

This specification signed and witnessed this 15th day of July, A. D. 1902.

LAMAR LYNDON.

In presence of—
ALFD. W. BIDDLE,
A. N. JESBERA.